E. MOWRY.
CASTER WHEEL.
APPLICATION FILED FEB. 24, 1919.
1,395,449.
Patented Nov. 1, 1921.
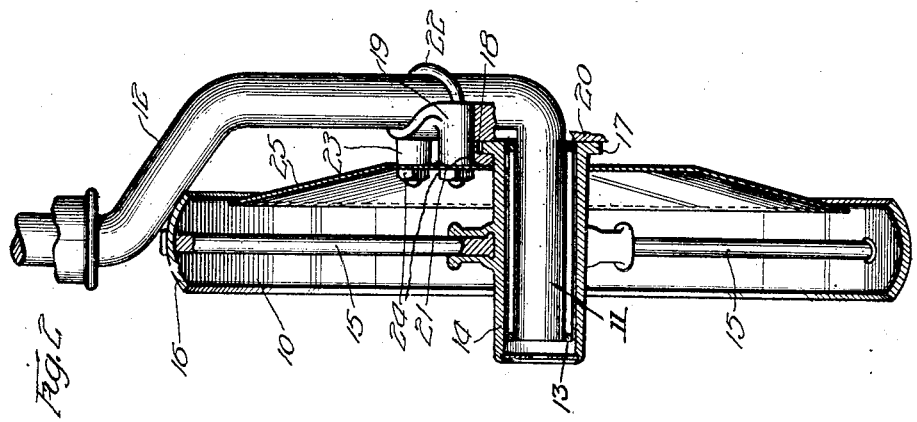
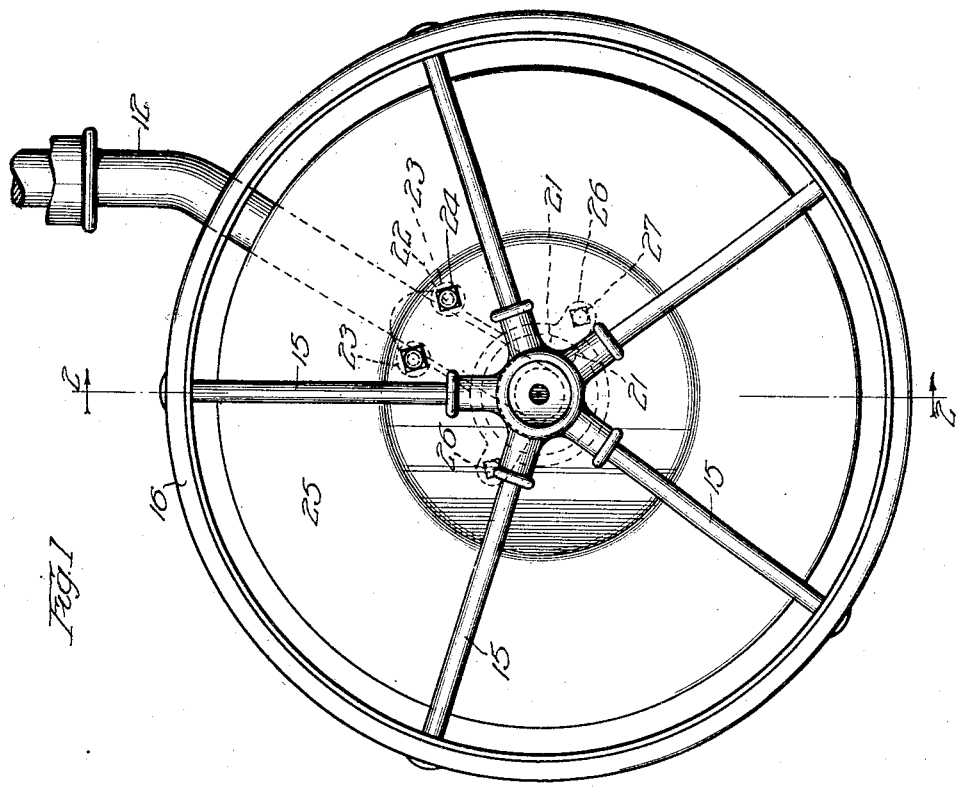
Inventor
Edward Mowry,
By Chas. E. Lord
Atty.

UNITED STATES PATENT OFFICE.

EDWARD MOWRY, OF STERLING, ILLINOIS, ASSIGNOR TO INTERNATIONAL HARVESTER COMPANY, A CORPORATION OF NEW JERSEY.

CASTER-WHEEL.

1,395,449.　　　　Specification of Letters Patent.　　Patented Nov. 1, 1921.

Application filed February 24, 1919. Serial No. 278,691.

*To all whom it may concern:*

Be it known that I, EDWARD MOWRY, a citizen of the United States, residing at Sterling, in the county of Whiteside and State of Illinois, have invented certain new and useful Improvements in Caster-Wheels, of which the following is a full, clear, and exact specification.

This invention relates to shields or guards for wheels and more particularly to shields for caster wheels such as used on harvesting machines.

In harvesting machines, and more particularly haying machines, such as side delivery hay rakes, caster wheels are used to support the outer ends of the frame. Wheels located in such a position come in contact with the hay, and unless some means is provided to prevent it, the hay will clog the wheel by being entwined between the spokes and around the wheel hub, thereby seriously impeding the progress of the machine.

With this difficulty in mind, the object of the present invention is to prevent the hay from clogging the wheels and from delaying the operation of the machine and injuring the wheel construction.

With this object in view, the present embodiment of the invention consists in a shield secured to the wheel support in such a manner as to effectively prevent hay from passing between the spokes.

One embodiment of the invention is illustrated in the accompanying drawing, and in the drawing,—

Figure 1 shows a side elevation of the improved construction, and

Fig. 2 is a sectional view taken on line 2—2 of Fig. 1.

As illustrated in the drawing, the caster wheel 10 is rotatably mounted on an outturned end or axle 11 formed on a post 12, this post being secured in any suitable manner to the frame of the machine. The usual bushing 13 is interposed between the hub 14 of the wheel and the outturned end or axle 11. The wheel may be of any suitable construction and that illustrated is provided with a series of spokes 15 extending from a hub 14 to a rim 16. In order to retain the wheel in place on the axle 11 the hub 14 is formed with an annular flange 17 and this flange is partly inclosed in a semi-circular channel 18 formed in a bracket member 19 secured to an upright portion of the post 12. The bracket 19 is also provided with a circular rear wall 20 which entirely surrounds the axle 11, a semi-circular flange 21 forming with this rear wall the channel 18 above referred to. The bracket 19 is secured to the upright portion of the post 12 by means of a U-shaped bolt 22 which passes through sleeve portions 23 of the bracket and is provided with retaining nuts 24 at the free ends thereof.

In order to prevent the grass from becoming entwined in the spokes of the wheel, and around the wheel hub, a stationary shield 25 is secured to the post 12 by means of the U-bolt 22 and nuts 24 above mentioned, suitable apertures being provided in the shield for the reception of the free ends of the U-bolt. The ends of the portion 21 of the bracket are provided with lateral extensions 26 which are also secured to the shield 25 by means of bolts 27.

From the above description it will be noted that one set of nuts is sufficient to secure the shield 25 to the bracket 19, and the bracket 19 to the upright portion of the post 12. It will also be noted that the shield 25 is stationary, while the wheel rotates, and that the outer edge of the shield is positioned within the rim of the weel.

From the above description it will be seen that a simple and efficient device has been provided for the purpose of preventing the grass from becoming entwined in the spokes of the wheel, or around the wheel hub, and a device which can readily and quickly be placed on any standard caster wheel construction.

While I have in the above specification shown and described but one embodiment of my invention, it is to be understood that it is capable of many modifications. Changes therefore in the construction and arrangement of parts may be made without departing from the spirit and scope of the invention as expressed in the following claims:

1. A device of the class described, comprising, in combination, a supporting member, a wheel journaled thereon and having a hub provided with an annular flange, a bracket secured to said supporting member and provided with a channel portion engaging said flange, a wheel shield carried by said bracket and a U-shaped element engaged about the supporting member with its arm engaging the bracket and shield, and means for clamping all together.

2. A device of the class described, comprising, in combination, a supporting member, a wheel journaled thereon, a bracket retaining said wheel on said support, a wheel shield carried by said bracket, and unitary clamping means for detachably fastening the bracket, shield and wheel to said supporting member.

In testimony whereof I affix my signature.

EDWARD MOWRY.